United States Patent
Hirabayashi

(10) Patent No.: US 10,998,554 B2
(45) Date of Patent: May 4, 2021

(54) CATALYST LAYER FOR FUEL CELL ELECTRODE, AND FUEL CELL

(71) Applicant: TOYOTA JIDOSHA KABUSHIKI KAISHA, Aichi (JP)

(72) Inventor: Kazuhiro Hirabayashi, Shizuoka (JP)

(73) Assignee: TOYOTA JIDOSHA KABUSHIKIKAISHA, Aichi (JP)

( * ) Notice: Subject to any disclaimer, the term of this patent is extended or adjusted under 35 U.S.C. 154(b) by 28 days.

(21) Appl. No.: 15/971,920

(22) Filed: May 4, 2018

(65) Prior Publication Data
US 2018/0331372 A1 Nov. 15, 2018

(30) Foreign Application Priority Data

May 10, 2017 (JP) .............................. JP2017-093859

(51) Int. Cl.
| | | |
|---|---|---|
| H01M 8/00 | (2016.01) | |
| H01M 4/86 | (2006.01) | |
| H01M 8/1004 | (2016.01) | |
| H01M 8/1018 | (2016.01) | |
| H01M 4/90 | (2006.01) | |

(52) U.S. Cl.
CPC ....... *H01M 4/8605* (2013.01); *H01M 4/8626* (2013.01); *H01M 4/9083* (2013.01); *H01M 8/1004* (2013.01); *H01M 8/1018* (2013.01); *H01M 2008/1095* (2013.01); *H01M 2300/0082* (2013.01)

(58) Field of Classification Search
CPC .. H01M 4/926; H01M 8/1004; H01M 4/8626; H01M 8/1018; H01M 2008/1095; H01M 2300/0082; H01M 4/8605; H01M 4/9083; H01M 4/921
See application file for complete search history.

(56) References Cited

U.S. PATENT DOCUMENTS

| | | | |
|---|---|---|---|
| 2004/0131919 A1* | 7/2004 | Yasumoto | H01M 4/8605 429/490 |
| 2007/0003822 A1* | 1/2007 | Kocha | H01M 4/92 429/482 |
| 2011/0223494 A1* | 9/2011 | Feaver | H01M 4/8615 429/405 |

FOREIGN PATENT DOCUMENTS

| | | |
|---|---|---|
| CN | 101208820 A | 6/2008 |
| JP | 2012-129059 A | 7/2012 |

\* cited by examiner

*Primary Examiner* — Nicholas P D'Aniello
(74) *Attorney, Agent, or Firm* — Hauptman Ham, LLP

(57) ABSTRACT

A catalyst layer for a fuel cell electrode includes a metal carrying catalyst containing a carbon carrier and a metal catalyst carried on the carbon carrier, and an ionomer, wherein a volume of micropores having a diameter of 5 nm to 40 nm in micropores of the carbon carrier is 4.5 ml/g to 9.3 ml/g, and a weight ratio of the carbon carrier to the ionomer is 1:0.50 to 1:0.85. A fuel cell includes the catalyst layer for a fuel cell electrode.

6 Claims, 2 Drawing Sheets

FIG. 1A  Less than 4.5 ml/g
"Only outer surfaces of micropores are coated"
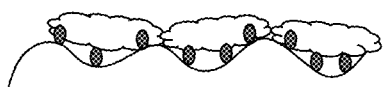
FIG. 1B  4.5 to 9.3 ml/g
"Inner and outer surfaces of micropores are coated"
FIG. 1C  More than 9.3 ml/g
"Only inner surfaces of micropores are coated"
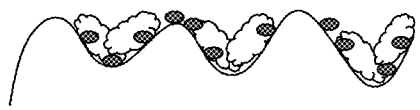
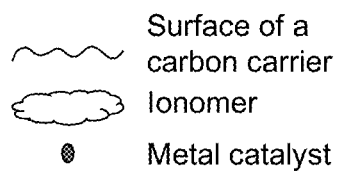
Surface of a carbon carrier
Ionomer
Metal catalyst

CATALYST LAYER FOR FUEL CELL ELECTRODE, AND FUEL CELL

CROSS-REFERENCE TO RELATED ARTS

This application claims priority from Japanese Patent Application JP 2017-093859 filed on May 10, 2017, the content of which is hereby incorporated by reference into this application.

BACKGROUND

Technical Field

Exemplary embodiments relate to catalyst layers for fuel cell electrodes, and fuel cells.

Background Art

Solid polymer electrolyte fuel cells, which are fuel cells generating electricity through an electrochemical reaction between a fuel gas and an oxidizing agent gas, have been receiving attention as an energy source. The solid polymer electrolyte fuel cells can operate at room temperature, and also have a high output density. For these reasons, the solid polymer electrolyte fuel cells have been actively examined as a form suitable for applications to vehicles.

In general, the solid polymer electrolyte fuel cell comprises a membrane electrode assembly ("fuel electrode-solid polymer electrolyte membrane-air electrode") (hereinafter, also referred to as an "MEA") including a solid polymer electrolyte, which is an electrolyte membrane, and electrodes (air electrode and fuel electrode) which are composed of a catalyst layer and bonded to both surfaces of the electrolyte membrane, respectively. The MEA may further include a gas diffusion layer bonded to both surfaces of the MEA. A solid polymer electrolyte fuel cell having such a configuration is referred to as a membrane electrode gas diffusion layer assembly ("gas diffusion layer-MEA-gas diffusion layer") (hereinafter, also referred to as an "MEGA").

Each of the electrodes is formed of a catalyst layer. The catalyst layer generates an electrode reaction by an electrode catalyst contained in the catalyst layer. Progression of the electrode reaction requires a three-phase interface where three phases of an electrolyte, a catalyst, and a reactive gas are present together. Thus, the catalyst layer, in general, is composed of a layer including a catalyst (herein, including not only a catalyst which acts alone but also metal catalyst carried on a carrier (hereinafter, also referred to as a metal carrying catalyst)), and an electrolyte. The gas diffusion layer feeds the reactive gas to the catalyst layer, and gives and receives electrons. For the gas diffusion layer, a porous material having electron conductivity is used.

For example, JP Patent Publication (Kokai) No. 2012-129059A discloses a carrying catalyst for a fuel cell including a carbon carrier whose micropores having a diameter of 10 nm or less have a volume within the range of 0.03 to 0.15 cm$^3$/g, and catalyst particles carried on the carbon carrier, wherein the amount of an acidic functional group per specific surface area is 0.4 µmol/m$^2$ or more. A catalyst having high activity is achieved through control of a volume of the micropores having a diameter of 10 nm or less in the carbon carrier and the amount of an acidic functional group per specific surface area of the catalyst within these ranges.

SUMMARY

Unfortunately, the volume of the micropores of the carbon carrier specified in JP Patent Publication (Kokai) No. 2012-129059A is small, and the embodiment disclosed in JP Patent Publication (Kokai) No. 2012-129059A is difficult to apply to a carbon carrier having a large volume of micropores. A carbon carrier having a small volume of micropores cannot provide effects, such as prevention of aggregation of carbon carriers and ensuring of liquid water for the proton conduction function of an electrolyte ionomer.

Accordingly, exemplary embodiments relate to providing a catalyst layer for a fuel cell electrode comprising a carbon carrier having an optimal volume of micropores, and a fuel cell including the catalyst layer.

An electrolyte ionomer forms aggregates (clusters) whose sizes are at least about 5 nm, usually 10 nm to 40 nm. The ionomer has a size of about 40 nm at most, and can invade into micropores of the carbon carrier having a primary micropore diameter, which is usually several nanometers to several hundreds of nanometers. Accordingly, through optimization of a volume of micropores whose diameter is within the range from the approximate minimum size (5 nm) of the aggregate of the ionomer to the approximate maximum size (40 nm) thereof in micropores of the carbon carrier, and optimization of a weight ratio of the carbon carrier to the ionomer, the micropores can be internally and externally coated with the ionomer. As a result, it is considered that the network of ionomers and the contact between the ionomer and the metal catalyst (such as platinum cobalt particles) can be compatible, increasing the utilization rate of the metal catalyst.

Unfortunately, the conventional technique has not revealed the optimal index for the volume of the micropores of the carbon carrier which can be invaded by an ionomer.

For example, if a volume of micropores having a diameter of 5 nm to 40 nm in micropores of a carbon carrier is controlled within a specific range and a weight ratio of the carbon carrier to an ionomer is controlled within a specific range to form a catalyst layer for a fuel cell electrode, and a fuel cell is produced with the catalyst layer for a fuel cell electrode, the resulting fuel cell has high output performance. Based on the findings, exemplary embodiments are shown below.

For example, exemplary embodiments are as follows.
(1) A catalyst layer for a fuel cell electrode, comprising:
a metal carrying catalyst containing a carbon carrier and a metal catalyst carried on the carbon carrier, and
an ionomer,
wherein a volume of micropores having a diameter of 5 nm to 40 nm in micropores of the carbon carrier is 4.5 ml/g to 9.3 ml/g, and
a weight ratio of the carbon carrier to the ionomer is 1:0.50 to 1:0.85.
(2) The catalyst layer for a fuel cell electrode according to (1), wherein the volume of the micropores having a diameter of 5 nm to 40 nm in the micropores of the carbon carrier is 5.0 ml/g to 8.0 ml/g.
(3) A fuel cell comprising:
a membrane electrode assembly including a solid polymer electrolyte, an air electrode and a fuel electrode wherein the air electrode and the fuel electrode are bonded to both surfaces of the solid polymer electrolyte, respectively,
wherein at least one of the air electrode and the fuel electrode comprises the catalyst layer for a fuel cell electrode according to (1) or (2).

According to the exemplary embodiments, a catalyst layer for a fuel cell electrode comprising a carbon carrier having an optimal volume of micropores, and a fuel cell including the catalyst layer and having high output performance are provided.

BRIEF DESCRIPTION OF THE DRAWINGS

FIGS. 1A-1C are diagrams schematically illustrating the relationship between a volume of micropores having a diameter of 5 nm to 40 nm in micropores of a carbon carrier and coating of an ionomer to micropores.

DETAILED DESCRIPTION OF THE EMBODIMENTS

Figure 2:
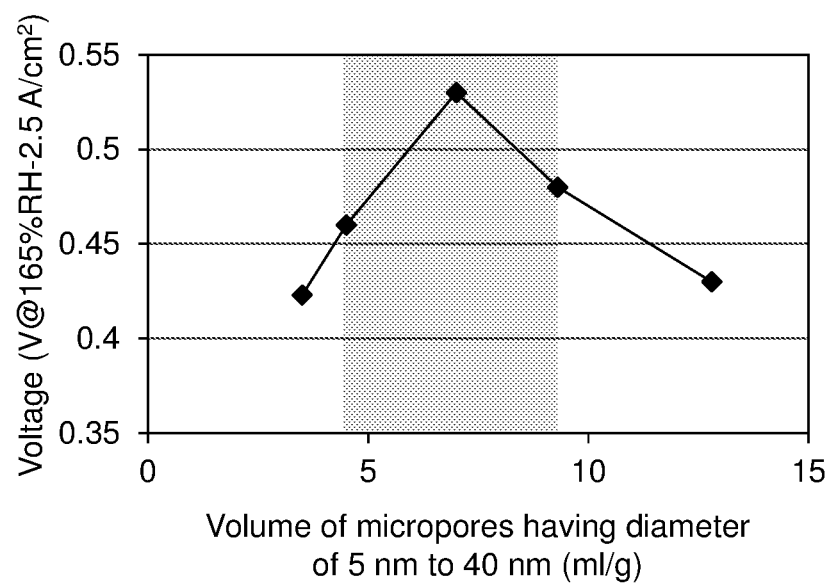
FIG. 2 is a diagram illustrating a voltage against a volume of micropores having a diameter of 5 nm to 40 nm in micropores of a carbon carrier in MEGAs in Comparative Examples 1 and 2 and Examples 1 to 3.

Preferred embodiment will now be described.

Herein, the features of the exemplary embodiments will be appropriately described with reference to the drawings. In the drawings, dimensions and shapes of parts are exaggerated for clarification, and actual dimensions and shapes are not exactly illustrated. Accordingly, the dimensions and shapes of parts illustrated in these diagrams are not construed to limit the technical scope of the exemplary embodiments. The catalyst layer for a fuel cell electrode and the fuel cell described herein are not limited to the following embodiment, and can be implemented in a variety of forms changed or modified by persons skilled in the art without departing from the gist of the exemplary embodiments.

The catalyst layer for a fuel cell electrode described herein (also simply referred to as a "catalyst layer" in this specification (including WHAT IS CLAIMED IS: and the drawings, the same is applied below)) comprises a metal carrying catalyst including a carbon carrier and a metal catalyst, and an ionomer.

In the carbon carrier of the metal carrying catalyst in the catalyst layer for a fuel cell electrode described herein, a volume of micropores having a diameter of 5 nm to 40 nm in micropores of the carbon carrier is 4.5 ml/g to 9.3 ml/g, preferably 5.0 ml/g to 8.0 ml/g.

In the micropores of the carbon carrier of the metal carrying catalyst of the catalyst layer for a fuel cell electrode described herein, the volume of the micropores having a diameter of 5 nm to 40 nm is measured by a BET multi-point method through nitrogen adsorption at a liquid nitrogen temperature using a pre-treated carbon carrier. The pre-treatment to measure the volume of the micropores in the carbon carrier is performed under a condition allowing sufficient removal of volatile substances such as the moisture content in the carbon carrier. For example, the pre-treatment is performed as follows: The carbon carrier is placed in vacuum, and is kept at a temperature of usually 100° C. to 125° C., preferably 110° C. to 120° C. for usually 5 hours to 8 hours, preferably 6 hours to 9 hours.

In the catalyst layer for a fuel cell electrode described herein, a weight ratio of the carbon carrier to the ionomer (carbon carrier:ionomer) is 1:0.50 to 1:0.85, preferably 1:0.55 to 1:0.75. In calculation of the weight ratio of the carbon carrier to the ionomer herein, the weight of the carbon carrier and that of the ionomer are each a weight of the solid content after removal of volatile substances therefrom, for example, a weight after a heat treatment at usually 100° C. to 150° C., preferably 110° C. to 130° C. for usually 5 hours to 8 hours, preferably 6 hours to 9 hours.

FIGS. 1A-1C schematically illustrate the relationship between a volume of micropores having a diameter of 5 nm to 40 nm in micropores of a carbon carrier and coating of an ionomer to micropores.

As illustrated in FIG. 1A, if the volume of the micropores having a diameter of 5 nm to 40 nm in the micropores of the carbon carrier is less than 4.5 ml/g and even if the weight ratio of the carbon carrier to the ionomer is within the optimal range, only the outer surfaces of the micropores of the metal carrying catalyst are coated with the ionomer. As a result, the catalyst metal in the inner surfaces of the micropores is slightly coated with the ionomer, causing a reduced effective usage rate of the catalyst metal In contrast, as illustrated in FIG. 1C, if the volume of the micropores having a diameter of 5 nm to 40 nm in the micropores of the carbon carrier is more than 9.3 ml/g and even if the weight ratio of the carbon carrier to the ionomer is within the optimal range, only the inner surfaces of the micropores of the metal carrying catalyst are coated with the ionomer. As a result, a large amount of the ionomer is buried in the micropores, causing disconnection of the ionic conduction path to the surface of the carbon carrier and thus a reduced effective usage rate of the catalyst metal.

Accordingly, as illustrated in FIG. 1B, if the volume of the micropores having a diameter of 5 nm to 40 nm in the micropores of the carbon carrier is 4.5 ml/g to 9.3 ml/g and the weight ratio of the carbon carrier to the ionomer is within the range specified above, the inner surfaces and the outer surfaces of the micropores of the metal carrying catalyst can be coated with the ionomer, achieving the compatibility between the network of ionomers and the contact of the ionomer with the metal catalyst and an enhanced effective usage rate of the catalyst metal.

Any known carbon carrier in the technical field can be used as the carbon carrier of the metal carrying catalyst in the catalyst layer for a fuel cell electrode described herein except that the volume of the micropores having a specific size is within the range specified above. Examples of the carbon carrier include, but should not be limited to, acetylene black, and thermal black.

For example, the carbon carrier of the metal carrying catalyst in the catalyst layer for a fuel cell electrode described herein is preferably prepared with YS carbon manufactured by SN2A. For example, YS carbon can be subjected to a heat treatment for control of the volume of the micropores having a diameter of 5 nm to 40 nm in the micropores of the carbon carrier to within the above range. For example, YS carbon is fired in the air at a firing temperature of usually 515° C. to 545° C., preferably 520° C. to 540° C. for usually 4 hours to 6 hours, preferably 4.5 hours to 5.5 hours.

As properties of the carbon carrier of the metal carrying catalyst in the catalyst layer for a fuel cell electrode described herein, for example, the specific surface area measured by the BET method is, but should not be limited to, usually 400 $m^2$/g to 500 $m^2$/g, preferably 430 $m^2$/g to 460 $m^2$/g.

As properties of the carbon carrier of the metal carrying catalyst in the catalyst layer for a fuel cell electrode described herein, for example, the particle diameter measured by SEM is, but should not be limited to, usually 10 μm to 50 μm, preferably 20 μm to 40 μm.

As properties of the carbon carrier of the metal carrying catalyst in the catalyst layer for a fuel cell electrode described herein, for example, the crystallinity measured by Raman spectroscopy is, but should not be limited to, usually 1.0 to 1.5, preferably 1.2 to 1.4 in the ratio D/G.

The metal catalyst in the metal carrying catalyst in the catalyst layer for a fuel cell electrode described herein is carried on the carbon carrier. The metal catalyst is carried on the surface of the carbon carrier or the surfaces of the micropores of the carbon carrier.

Any metal catalyst that exhibits a catalytic action in the following reactions at the electrodes of an MEA or an MEGA:

air electrode (cathode): $O_2+4H^++4e^-\rightarrow 2H_2O$ fuel electrode (anode): $2H_2\rightarrow 4H^++4e^-$ can be used, and any known metal catalyst in the technical field can be used. Examples of the metal catalyst include, but should not be limited to, metals such as platinum, ruthenium, iridium, rhodium, palladium, osmium, tungsten, lead, iron, chromium, cobalt, nickel, manganese, vanadium, molybdenum, gallium, and aluminum; or alloys thereof such as platinum cobalt.

Preferred is platinum cobalt as a metal catalyst of the metal carrying catalyst in the catalyst layer for a fuel cell electrode described herein.

The metal catalyst can be used in any amount, and the amount of the metal catalyst is usually 10% by weight to 50% by weight, preferably 30% by weight to 40% by weight relative to the total weight of the metal carrying catalyst.

The catalyst layer for a fuel cell electrode described herein can contain the metal carrying catalyst in any amount as long as the weight ratio of the carbon carrier to the ionomer is within the range specified above. The amount of the metal carrying catalyst is usually 60% by weight to 80% by weight, preferably 70% by weight to 80% by weight relative to the total weight of the catalyst layer for a fuel cell electrode.

In the catalyst layer for a fuel cell electrode described herein, the ionomer is also referred to as a cation exchange resin, and is present as clusters formed of ionomer molecules. Any known ionomer in the technical field can be used. Examples of usable ionomers include, but should not be limited to, fluorinated resin electrolytes such as perfluorosulfonic acid resin materials; sulfonated plastic electrolytes such as sulfonated polyether ketone, sulfonated polyethersulfone, sulfonated polyether ethersulfone, sulfonated polysulfone, sulfonated polysulfide, and sulfonated polyphenylene; and sulfoalkylated plastic electrolytes such as sulfoalkylated polyether ether ketone, sulfoalkylated polyethersulfone, sulfoalkylated polyether ethersulfone, sulfoalkylated polysulfone, sulfoalkylated polysulfide, and sulfoalkylated polyphenylene.

A preferred ionomer in the catalyst layer for a fuel cell electrode described herein is a perfluorosulfonic acid resin material having a hydrophobic carbon-fluorine Teflon skeleton and a sulfonate group, such as Nafion, which is a fluorinated resin electrolyte.

As properties of the ionomer in the catalyst layer for a fuel cell electrode described herein, for example, the cation exchange amount measured by the titration method is usually $1.0\times10^{-3}$ mol/g to $1.5\times10^{-3}$ mol/g, preferably $1.1\times10^{-3}$ mol/g to $1.2\times10^{-3}$ mol/g.

The catalyst layer for a fuel cell electrode described herein can contain the ionomer in any amount as long as the weight ratio of the carbon carrier to the ionomer is within the range specified above. The amount of the ionomer is usually 20% by weight to 40% by weight, preferably 20% by weight to 30% by weight relative to the total weight of the catalyst layer for a fuel cell electrode.

The catalyst layer for a fuel cell electrode described herein used as an air electrode and/or a fuel electrode of an MEA or an MEGA in a variety of electrochemical devices such as solid polymer electrolyte fuel cells can improve the cell performance of the devices.

Furthermore, exemplary embodiments relate to a fuel cell comprising a membrane electrode assembly ("fuel electrode-solid polymer electrolyte membrane-air electrode") (MEA) including a solid polymer electrolyte, an air electrode and a fuel electrode wherein the air electrode and the fuel electrode are bonded to both surfaces of the solid polymer electrolyte, respectively, wherein at least one of the air electrode and the fuel electrode comprises the catalyst layer for a fuel cell electrode described herein.

Any known solid polymer electrolyte in the technical field can be used as the solid polymer electrolyte in the fuel cell according to the exemplary embodiments. For example, Nafion (manufactured by E. I. du Pont de Nemours and Company) can be used, but should not be limited thereto.

The fuel cell according to the exemplary embodiments can include the catalyst layer for a fuel cell electrode described herein as one or both of the air electrode and the fuel electrode.

The fuel cell according to the exemplary embodiments has optimized output performance through optimization of the volume of the micropores having a diameter of 5 nm to 40 nm in the micropores of the carbon carrier.

The catalyst layer for a fuel cell electrode described herein can be prepared by any known method in the technical field except that in the micropores of the carbon carrier of the metal carrying catalyst, the volume of the micropore having a diameter of 5 nm to 40 nm and the weight ratio of the carbon carrier to the ionomer are as specified above. For example, the catalyst layer for a fuel cell electrode described herein can be prepared as follows.

(i) Step of carrying a metal catalyst on a carbon carrier to prepare a metal carrying catalyst A carbon carrier having the above-specified volume of the micropores having a diameter of 5 nm to 40 nm in the micropores of the carbon carrier and an oxidized metal catalyst precursor are suspended in a solvent, such as pure water, at usually 15° C. to 30° C., preferably 20° C. to 25° C. to prepare a suspension. The metal catalyst precursor in the suspension is reduced into a metal catalyst by a reducing agent, such as ethanol or sodium borohydride, at usually 55° C. to 95° C., preferably 60° C. to 90° C. to prepare a dispersion solution. The dispersion solution is filtered, and the obtained cake is dried at usually 80° C. to 100° C., preferably 85° C. to 95° C. for usually 13 hours to 17 hours, preferably 14 hours to 16 hours to yield a powder. The powder is fired under an inert atmosphere, such as under a nitrogen atmosphere, at usually 600° C. to 1000° C., preferably 700° C. to 900° C. for usually 1 hour to 6 hours, preferably 1 hour to 3 hours to yield a metal carrying catalyst. Here, the firing is performed to enhance the durability of the metal carrying catalyst in use at high temperature. The firing is performed within the range not changing the volume of the micropores having a diameter of 5 nm to 40 nm in the micropores of the carbon carrier.

(ii) Step of mixing the metal carrying catalyst prepared in (i) with an ionomer to prepare a catalyst ink The metal carrying catalyst prepared in (i) is mixed with an ionomer such that the weight ratio of the carbon carrier to the ionomer is within the range specified above. The mixture is suspended in a solvent, such as pure water, at usually 15° C. to 30° C., preferably 20° C. to 25° C. to prepare a suspension. An organic solvent, such as ethanol, is added to the suspension. The suspension is further dispersed by a known dispersion process, for example, the suspension is further ultrasonically dispersed, at usually 5° C. to 15° C., preferably 5° C. to 10° C. for usually 30 minutes to 70 minutes, preferably 50 minutes to 60 minutes to prepare a catalyst ink.

(iii) Step of forming a catalyst layer with the catalyst ink prepared in (ii)

The catalyst ink prepared in (ii) is applied onto a releasable substrate, such as a Teflon sheet, at usually 15° C. to 30° C., preferably 20° C. to 25° C. by a known spraying, adhering, or applying process, such as a process using gravity, atomizing force, or electrostatic force, such as an applicator, to form a catalyst layer precursor. The catalyst layer precursor on the substrate is dried by a known drying process, such as a process using an air dryer at usually 60° C. to 90° C., preferably 75° C. to 85° C. for usually 1 minute to 10 minutes, preferably 4 minutes to 6 minutes to remove volatile substances such as a solvent. The catalyst layer is thereby formed, and the catalyst layer is peeled from the substrate.

Here, the catalyst ink is sprayed, adhered, or applied onto the substrate, and then is dried and peeled to obtain the catalyst layer. Alternatively, the catalyst ink can be directly sprayed, adhered, or applied onto the surface of the solid polymer electrolyte membrane, and then dried to bond the catalyst layer to the solid polymer electrolyte membrane.

In the steps (i) to (iii) above, the materials can be added in any order and/or by any process.

Furthermore, the fuel cell according to the exemplary embodiments can be produced with the catalyst layer for a fuel cell electrode described herein by any known method in the technical field. For example, the fuel cell according to the exemplary embodiments can be prepared as follows.

(iv) Step of combining the catalyst layer formed in (iii) with a solid polymer electrolyte membrane and a gas diffusion layer to produce an MEGA The obtained catalyst layer is used as an air electrode and/or a fuel electrode. The air electrode is disposed on one surface of the solid polymer electrolyte membrane, and the fuel electrode is disposed on the other surface of the solid polymer electrolyte membrane to produce a layer assembly. Here, the air electrode and the fuel electrode are prepared so as to match the catalyst layer to each electrode by varying the metal catalyst to be used. Furthermore, gas diffusion layers are disposed on the outer surfaces of the air electrode and the fuel electrode.

Here, examples of the solid polymer electrolyte membrane include, but should not be limited to, GORE-SELECT (manufactured by W. L. Gore & Associates, Co., LTD.).

Examples of the gas diffusion layer include, but should not be limited to, Torayca (manufactured by Toray Industries, Inc.).

The layer assembly composed of gas diffusion layer-air electrode-solid polymer electrolyte membrane-fuel electrode-gas diffusion layer is press bonded with a hot press at a temperature of usually 100° C. to 150° C., preferably 130° C. to 140° C. and a pressure of usually 2 MPa to 5 MPa, preferably 3 MPa to 4 MPa for usually 60 seconds to 240 seconds, preferably 120 seconds to 180 seconds to yield an MEGA.

(v) Step of manufacturing a fuel cell from the MEGA produced in (iv)

The obtained MEGA is used as a single cell, and several cells are combined to manufacture a fuel cell.

The fuel cell produced with the catalyst layer for a fuel cell electrode described herein has high cell performance.

EXAMPLES

Some examples of the exemplary embodiments will now be described, but the exemplary embodiments are not construed to be limited to these examples.

1. Preparation of Sample
1-1. Raw Materials
1-1-1. Raw Materials for Carbon Carrier YS carbon manufactured by SN2A (specific surface area: about 110±10 $m^2$/g, purity: 99.5% or more, resistance: 0.5 to 0.6 ohm (Ω))

1-1-2. Noble Metals platinum (Pt) (aqueous dinitroamine platinum solution (60% by weight or more of Pt))

cobalt (Co) (aqueous cobalt nitrate solution (65% by weight or more of Co))

1-2. Production of a Membrane Electrode Gas Diffusion Layer Assembly (MEGA)

Comparative Example 1 an MEGA produced with a catalyst layer for a fuel cell electrode containing a metal carrying catalyst containing a carbon carrier, wherein a volume of micropores having a diameter of 5 nm to 40 nm in micropores was 3.5 ml/g, and an ionomer (1) Preparation of a Noble Metal Carrying Catalyst PtCo/C (PtCo Carrying Carbon)

(i) YS carbon manufactured by SN2A was heated in the air to 510° C. over 1.5 hours, and was fired while being kept at 510° C. for 5 hours to prepare a carbon carrier wherein a volume of micropores having a diameter of 5 nm to 40 nm in micropores was 3.5 ml/g. Here, the volume of the micropores having a diameter of 5 nm to 40 nm in the micropores of the carbon carrier was determined by a BET multi-point method with a TriStar 3000 analyzer manufactured by SHIMADZU Corporation after the carbon carrier was placed in vacuum, and was kept at a temperature of 150° C. for 2 hours or longer to be pre-treated.

(ii) 0.1 N nitric acid (350 g) and the carbon carrier (20 g) prepared in (i) were placed into a 2000 ml beaker, and were mixed under stirring at 25° C. for one day to prepare a suspension.

(iii) An aqueous dinitroamine platinum solution (60% by weight of Pt) containing platinum (5.72 g) as a platinum precursor such that 38% by weight of platinum relative to the total weight of the final product was carried was added to the suspension prepared in (ii) at 25° C., and the suspension was heated to 60 to 90° C. for 3 hours.

(iv) The dispersion solution prepared in (iii) was filtered, and the obtained cake was dried at 80° C. for 15 hours to yield a powder.

(v) The powder yielded in (iv) was fired under an argon atmosphere at 800° C. for 2 hours to yield a 38% by weight noble metal carrying catalyst Pt/C.

(vi) Pure water was added in an amount 80 times the total weight of the 38% by weight noble metal carrying catalyst Pt/C yielded in (v) and the materials were mixed with stirring at 25° C. for 5 minutes to prepare a suspension.

(vii) An aqueous cobalt nitrate solution as a cobalt precursor was added to the suspension prepared in (vi) at 25° C. such that the molar ratio of the platinum to the cobalt was 7:1. 1 to 6 mol equivalent of sodium borohydride relative to a cobalt atom in the cobalt nitrate was added to reduce the cobalt precursor into cobalt. A dispersion solution was thereby prepared.

(viii) The dispersion solution prepared in (vii) was filtered out, and the obtained cake was dried at 80° C. for 15 hours to yield a powder.

(ix) The powder yielded in (viii) was fired under an argon atmosphere at 800° C. for 2 hours to prepare a 40% by weight noble metal carrying catalyst PtCo/C.

(2) Preparation of a Catalyst Ink (i) Ultrapure water (8 g), the noble metal carrying catalyst PtCo/C (1 g) prepared in (1), and ethanol (6 g) were placed into a 50 ml beaker, and were mixed with stirring at 25° C. for 5 minutes to prepare a suspension.

(ii) An ionomer solution (10% by weight solution containing an ionomer (exchange amount: $1.11 \times 10^{-3}$ mol/g) and a solvent) was added to the suspension prepared in (i) at 25° C. such that the weight ratio of the ionomer solid content to the carbon carrier (ionomer solid content/carbon carrier) was 0.75. The solution was ultrasonically dispersed at 5 to 10° C. for 55 minutes to prepare a mixed solution.

(iii) The mixed solution prepared in (ii) was dispersed at 30 m/s for 15 minutes at room temperature with a thin film rotary high-speed mixer (FILMIX) manufactured by PRIMIX Corporation to prepare a homogeneous catalyst ink.

(3) Preparation of a Catalyst Layer (i) The catalyst ink prepared in (2) was uniformly applied onto a Teflon sheet with a doctor blade such that the film thickness was 10 μm. A catalyst layer precursor was disposed on the Teflon sheet.

(ii) The catalyst layer precursor disposed on the Teflon sheet prepared in (i) was dried at 80° C. for 5 minutes with an air dryer to form a catalyst layer on the Teflon sheet.

(iii) The catalyst layer was peeled from the Teflon sheet to obtain the catalyst layer.

(4) Production of an MEGA (Single Cell)

(i) The catalyst layer formed in (3) was used as an air electrode (cathode), and the catalyst layer formed in (3), wherein the steps (vi) to (ix) in (1) were excluded, was used as a fuel electrode (anode). A solid polymer electrolyte membrane GORE-SELECT (manufactured by W. L. Gore & Associates, Co., LTD.) was disposed between the air electrode and the fuel electrode to produce a layer assembly (air electrode-solid polymer electrolyte membrane-fuel electrode). The layer assembly was press bonded with a hot press at 140° C. for 180 seconds to produce an MEA.

(ii) A gas diffusion layer Torayca (manufactured by Toray Industries, Inc.) was disposed on both the electrodes of the MEA produced in (i) to produce a layer assembly (gas diffusion layer-MEA-gas diffusion layer). The layer assembly was press bonded with a hot press at 140° C. for 180 seconds to produce an MEGA.

Comparative Example 2 an MEGA produced with a catalyst layer for a fuel cell electrode containing a metal carrying catalyst containing a carbon carrier, wherein a volume of micropores having a diameter of 5 nm to 40 nm in micropores was 12.8 ml/g, and an ionomer An MEGA was produced by the same method as that in Comparative Example 1 except that in (i) of (1) in Comparative Example 1, YS carbon manufactured by SN2A was heated in the air to 550° C. over 1.5 hours, and was fired while being kept at 550° C. for 5 hours to prepare a carbon carrier, wherein a volume of micropores having a diameter of 5 nm to 40 nm in micropores was 12.8 ml/g, and then the resulting carbon carrier was used.

Example 1 an MEGA produced with a catalyst layer for a fuel cell electrode containing a metal carrying catalyst containing a carbon carrier, wherein a volume of micropores having a diameter of 5 nm to 40 nm in micropores was 4.5 ml/g, and an ionomer An MEGA was produced by the same method as that in Comparative Example 1 except that in (i) of (1) in Comparative Example 1, YS carbon manufactured by SN2A was heated in the air to 520° C. over 1.5 hours, and was fired while being kept at 520° C. for 5 hours to prepare a carbon carrier, wherein a volume of micropores having a diameter of 5 nm to 40 nm in micropores was 4.5 ml/g, and then the resulting carbon carrier was used.

Example 2 an MEGA produced with a catalyst layer for a fuel cell electrode containing a metal carrying catalyst containing a carbon carrier, wherein a volume of micropores having a diameter of 5 nm to 40 nm in micropores was 7.0 ml/g, and an ionomer An MEGA was produced by the same method as that in Comparative Example 1 except that in (i) of (1) in Comparative Example 1, YS carbon manufactured by SN2A was heated in the air to 530° C. over 1.5 hours, and was fired while being kept at 530° C. for 5 hours to prepare a carbon carrier, wherein a volume of micropores having a diameter of 5 nm to 40 nm in micropores was 7.0 ml/g, and then the resulting carbon carrier was used.

Example 3 an MEGA produced with a catalyst layer for a fuel cell electrode containing a metal carrying catalyst containing a carbon carrier, wherein a volume of micropores having a diameter of 5 nm to 40 nm in micropores was 9.3 ml/g, and an ionomer An MEGA was produced by the same method as that in Comparative Example 1 except that in (i) of (1) in Comparative Example 1, YS carbon manufactured by SN2A was heated in the air to 540° C. over 1.5 hours, and was fired while being kept at 540° C. for 5 hours to prepare a carbon carrier, wherein a volume of micropores having a diameter of 5 nm to 40 nm in micropores was 9.3 ml/g, and then the resulting carbon carrier was used.

2. Evaluation of Samples

Example 4

Measurement of Current-Voltage (I-V)

In the MEGAs produced in Comparative Examples 1 and 2 and Examples 1 to 3, the voltage at a current density of 2.5 A/cm$^2$ and a relative humidity of 165% was measured with a fuel cell evaluation system manufactured by TOYO Corporation by the following process. Each MEGA was heated to a temperature of 45° C. and humidified air (2 ml/min) and humidified hydrogen (0.5 ml/min) passing through a bubbler heated to 55° C. were then fed to the cathode electrode and the anode electrode to perform I-V measurement.

The results are shown in Table 1 and FIG. 2.

TABLE 1

Firing temperature of YS carbon, volume of micropores having diameter of 5 nm to 40 nm, voltage

| | Firing temperature (° C.) | Volume of micropores having diameter of 5 nm to 40 nm | Voltage@2.5 A/cm$^2$ (V) |
|---|---|---|---|
| Comparative Example 1 | 510 | 3.5 | 0.42 |

TABLE 1-continued

Firing temperature of YS carbon, volume of micropores having diameter of 5 nm to 40 nm, voltage

|  | Firing temperature (° C.) | Volume of micropores having diameter of 5 nm to 40 nm | Voltage@2.5 A/cm$^2$ (V) |
| --- | --- | --- | --- |
| Comparative Example 2 | 550 | 12.8 | 0.43 |
| Example 1 | 520 | 4.5 | 0.46 |
| Example 2 | 530 | 7.0 | 0.53 |
| Example 3 | 540 | 9.3 | 0.48 |

Table 1 and FIG. 2 show that the MEGAs produced with the carbon carriers, wherein the volume of micropores having a diameter of 5 nm to 40 nm in micropores was 4.5 ml/g to 9.3 ml/g, had increased voltages at a current density of 2.5 A/cm$^2$ and a relative humidity of 165%.

All publications, patents and patent applications cited in the present description are herein incorporated by reference as they are.

What is claimed is:

1. A catalyst layer for a fuel cell electrode, comprising:
a metal carrying catalyst containing a carbon carrier and a metal catalyst carried on the carbon carrier, and
an ionomer,
wherein
the metal catalyst comprises one or more of platinum, ruthenium, iridium, rhodium, palladium, osmium, tungsten, lead, iron, chromium, cobalt, nickel, manganese, vanadium, molybdenum, gallium, aluminum or platinum cobalt,
the carbon carrier comprises one or more of acetylene black or thermal black,
the ionomer comprises one or more of a fluorinated resin electrolyte, a sulfonated plastic electrolyte, or a sulfoalkylated plastic electrolyte,
a volume of micropores having a diameter of 5 nm to 40 nm in micropores of the carbon carrier is 4.5 ml/g to 9.3 ml/g,
a weight ratio of the carbon carrier to the ionomer is 1:0.50 to 1:0.85, and
the micropores having the diameter of 5 nm to 40 nm have inner surfaces and outer surfaces of the micropores are coated with the ionomer.

2. A fuel cell comprising:
a membrane electrode assembly including a solid polymer electrolyte, an air electrode and a fuel electrode wherein the air electrode and the fuel electrode are bonded to both surfaces of the solid polymer electrolyte, respectively,
wherein at least one of the air electrode and the fuel electrode comprises the catalyst layer for a fuel cell electrode according to claim 1.

3. The catalyst layer for the fuel cell electrode according to claim 1, wherein the volume of micropores having a diameter of 5 nm to 40 nm in micropores of the carbon carrier is 7.0 ml/g to 9.3 ml/g.

4. The catalyst layer for the fuel cell electrode according to claim 1, wherein the volume of micropores having a diameter of 5 nm to 40 nm in micropores of the carbon carrier is 5.0 ml/g to 8.0 ml/g.

5. The catalyst layer for the fuel cell electrode according to claim 1, wherein the ionomer comprises one or more clusters having a length of 5 nm to 40 nm.

6. The catalyst layer for the fuel cell electrode according to claim 1, wherein the metal catalyst comprises platinum cobalt.

* * * * *